United States Patent
Matsumoto et al.

(10) Patent No.: US 11,270,321 B2
(45) Date of Patent: Mar. 8, 2022

(54) ASSOCIATION ANALYSIS ON NOISY TRANSACTION DATA

(71) Applicant: International Business Machines Corporation, Armonk, NY (US)

(72) Inventors: Yusuke Matsumoto, Tokyo (JP); Yasue Makino, Tokyo (JP); Hirokazu Kobayashi, Tokyo (JP); Hiromi Kobayashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 16/551,848

(22) Filed: Aug. 27, 2019

(65) Prior Publication Data
US 2021/0065214 A1 Mar. 4, 2021

(51) Int. Cl.
*G06Q 30/02* (2012.01)
(52) U.S. Cl.
CPC ................ *G06Q 30/0201* (2013.01)
(58) Field of Classification Search
None
See application file for complete search history.

(56) References Cited

U.S. PATENT DOCUMENTS

| | | | |
|---|---|---|---|
| 2015/0106244 A1* | 4/2015 | Lo Faro | G06Q 40/12 705/30 |
| 2016/0092514 A1* | 3/2016 | Levitan | G06F 16/211 707/738 |
| 2017/0076206 A1* | 3/2017 | Lastras-Montano | G06F 16/9024 |
| 2017/0213252 A1 | 7/2017 | Rohan et al. | |
| 2018/0042530 A1 | 2/2018 | Böhm et al. | |
| 2019/0102383 A1 | 4/2019 | Dai et al. | |
| 2019/0220705 A1* | 7/2019 | Min | G06K 9/6231 |

OTHER PUBLICATIONS

Xiong et al, Enhancing Data Analysis with Noise Removal, 2006 (Year: 2006).*
Sugumar et et., "Design a Weight Based Sorting Distortion Algorithm for Privacy Preserving Data Mining," Middle-East Journal of Scientific Research, 2015, vol. 23, Issue 3, pp. 405-412.

* cited by examiner

*Primary Examiner* — Mohamed N El-Bathy
(74) *Attorney, Agent, or Firm* — Yee & Associates, P.C.

(57) ABSTRACT

Reducing noise during association analysis is provided. An association model is generated having a support value with respect to original data greater than a predefined minimum support value threshold level. A number of association rules corresponding to the association model are identified. It is determined whether the number of association rules corresponding to the association model is less than a predefined maximum number of association rules. In response to determining that the number of association rules corresponding to the association model is greater than the predefined maximum number of association rules, inverted data of the original data is generated. Another association model is generated having the support value with respect to the original data and the inverted data greater than the predefined minimum support value threshold level.

10 Claims, 7 Drawing Sheets

TRUTH TABLES OF ANALYSIS DATA

ORIGINAL TRANSACTION DATA TRUTH TABLE — 302

| ID | FRUIT | VEGETABLE | MEAT |
|---|---|---|---|
| 1 | T | T | F |
| 2 | F | T | T |
| 3 | T | F | T |
| 4 | F | F | T |
| 5 | F | F | T |

INVERTED TRANSACTION DATA TRUTH TABLE — 304

| ID | FRUIT INVERTED | VEGETABLE INVERTED | MEAT INVERTED |
|---|---|---|---|
| 1 | F | F | T |
| 2 | T | F | F |
| 3 | F | T | F |
| 4 | T | T | F |
| 5 | T | T | F |

FIG. 3

ASSOCIATION SCORING

ORIGINAL TRANSACTION DATA

| ID | FRUIT | VEGETABLE | MEAT | RECOMMENDATION | CERTAINTY FACTOR |
|---|---|---|---|---|---|
| 1 | T | T | F | MEAT | 0.58 |
| 2 | F | T | T | FRUIT | 0.42 |
| 3 | T | F | T | VEGETABLE | 0.67 |
| 4 | F | F | T | FRUIT | 0.33 |
| 5 | F | F | T | FRUIT | 0.44 |

402

404

INVERTED TRANSACTION DATA

| ID | FRUIT INVERTED | VEGETABLE INVERTED | MEAT INVERTED | RECOMMENDATION | CERTAINTY FACTOR |
|---|---|---|---|---|---|
| 1 | F | F | T | FRUIT INVERTED | 0.44 |
| 2 | T | F | F | MEAT INVERTED | 0.51 |
| 3 | F | T | F | FRUIT INVERTED | 0.33 |
| 4 | T | T | F | MEAT INVERTED | 0.47 |
| 5 | T | T | F | MEAT INVERTED | 0.38 |

FIG. 4

UPDATED ORIGINAL TRANSACTION DATA BASED ON CERTAINTY FACTOR VALUE COMPARISON

| ID | FRUIT | VEGETABLE | MEAT |
|----|-------|-----------|------|
| 1  | T     | T         | T    |
| 2  | F     | T         | F    |
| 3  | T     | T         | T    |
| 4  | F     | F         | F    |
| 5  | T     | F         | T    |

DELETING ASSOCIATION RULES CONTAINING NOISY DATA

| ID | FRUIT | VEGETABLE | MEAT |
|----|-------|-----------|------|
| 1  | T     | T         | T    |
| 2  | F     | T         | F    |
| 3  | T     | T         | T    |
| 5  | T     | F         | T    |

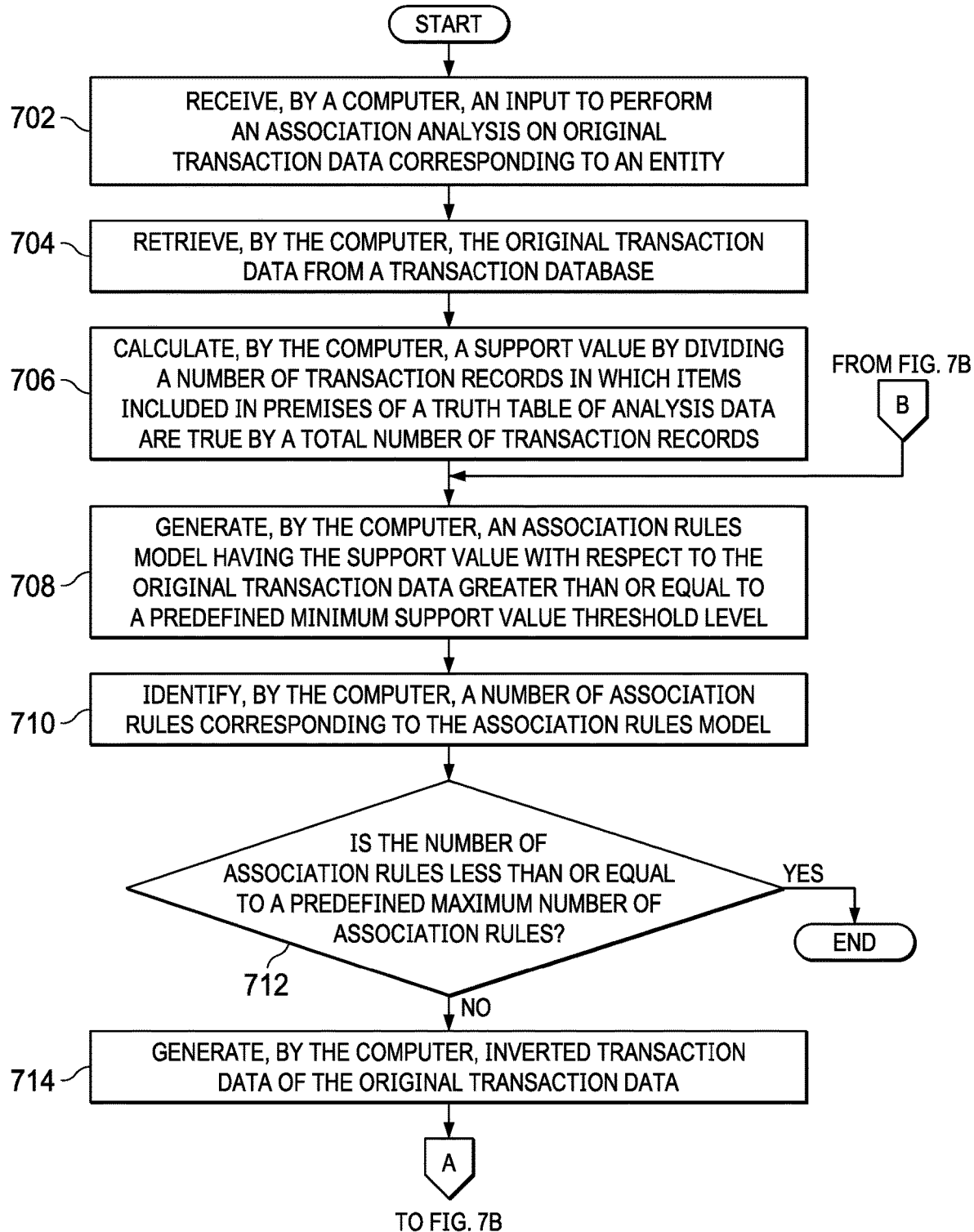

ASSOCIATION ANALYSIS ON NOISY TRANSACTION DATA

BACKGROUND

1. Field

The disclosure relates generally to association analysis and more specifically to reducing noise in transaction data during association analysis to decease a number of association rules corresponding to an association rules model of the transaction data, thereby increasing speed and performance of a data association analyzer.

2. Description of the Related Art

Association analysis is useful in identifying hidden relationships between items in large datasets. These relationships between items are expressed as association rules. Association analysis has been particularly useful in mining transaction databases. For example, many businesses accumulate large quantities of transaction data from their day-to-day operations. These businesses are interested in analyzing this transaction data to learn more about the purchasing behavior of their customers. In addition, these businesses can use this purchasing behavior information to support a variety of business-related activities, such as, for example, marketing management, inventory management, and customer relations management.

As an example, historic transaction data of a business may indicate that customers who purchase a particular item, such as diapers, may also purchase another item, such as milk. The historic transaction data may indicate that the first item is purchased by only 25% of all customers of the business, but that 80% of those customers who purchased the first item also purchased the second item. Businesses can use this type of association rule information to help identify new opportunities for cross-selling their products to customers.

SUMMARY

According to one illustrative embodiment, a computer-implemented method for reducing noise during association analysis is provided. An association model is generated having a support value with respect to original data greater than a predefined minimum support value threshold level. A number of association rules corresponding to the association model are identified. It is determined whether the number of association rules corresponding to the association model is less than a predefined maximum number of association rules. In response to determining that the number of association rules corresponding to the association model is greater than the predefined maximum number of association rules, inverted data of the original data is generated. Another association model is generated having the support value with respect to the original data and the inverted data greater than the predefined minimum support value threshold level. According to other illustrative embodiments, a computer system and computer program product for reducing noise during association analysis are provided.

BRIEF DESCRIPTION OF THE DRAWINGS

FIG. 3 is a diagram illustrating truth tables of analysis data in accordance with an illustrative embodiment;

FIG. 4 is a diagram illustrating an example of association scoring in accordance with an illustrative embodiment;

FIG. 5 is a diagram illustrating an example of updated original transaction data based on certainty factor value comparison in accordance with an illustrative embodiment;

FIG. 6 is a diagram illustrating an example of deleting association rules containing noisy data in accordance with an illustrative embodiment; and FIGS. 7A-7B are a flowchart illustrating a process for removing noise from original transaction data in accordance with an illustrative embodiment.

DETAILED DESCRIPTION

Figure 1:
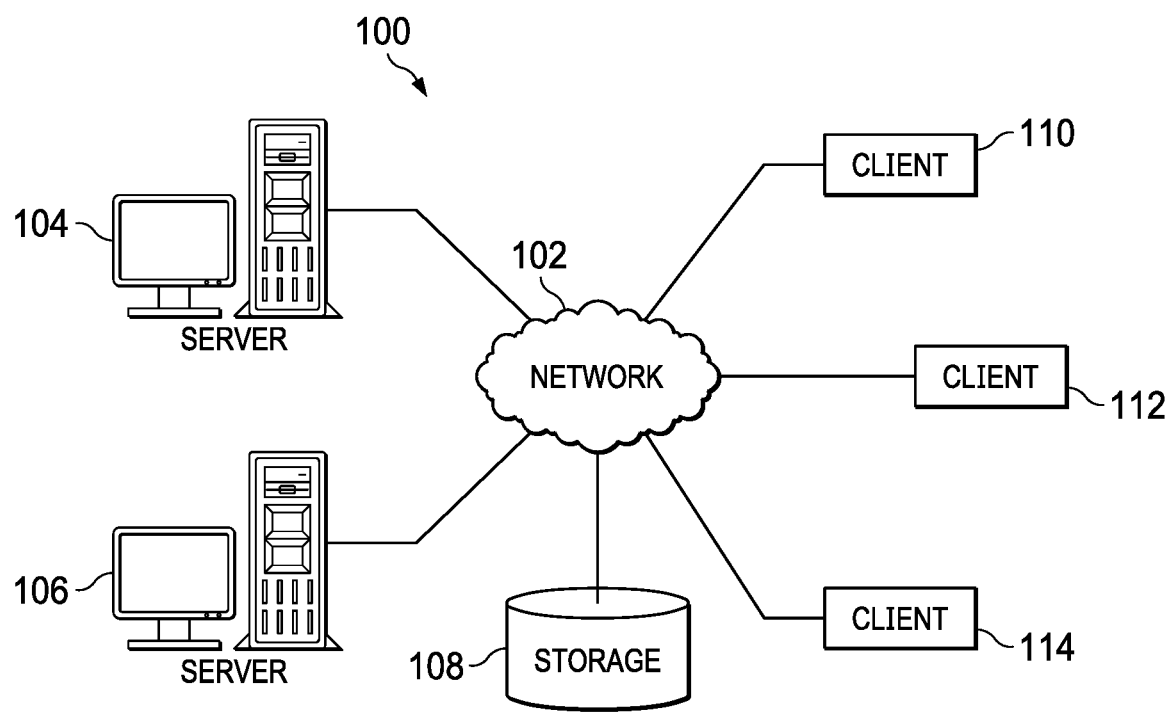
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
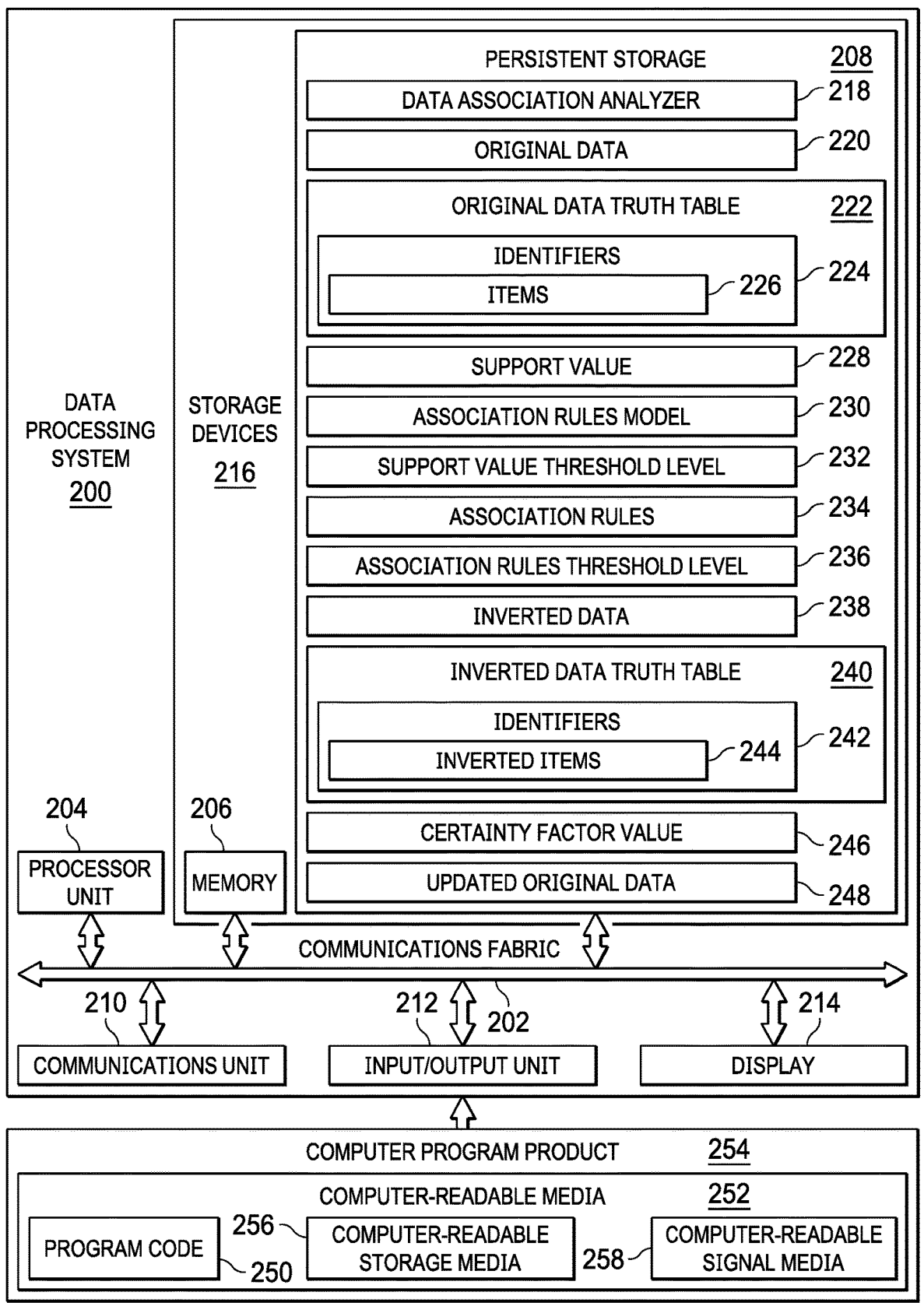
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide association analysis services corresponding to transaction data of one or more entities, such as, for example, businesses, organizations, institutions, agencies, and the like. However, it should be noted that illustrative embodiments are not limited to performing association analysis on transaction data only. In other words, the different illustrative embodiments may perform association analysis on any type of data, such as, for example, scientific data, medical data, and the like. Also, it should be noted that server 104 and server 106 may each represent a cluster of servers in one or more data centers. Alternatively, server 104 and server 106 may each represent computing nodes in one or more cloud environments.

Client 110, client 112, and client 114 also connect to network 102. Clients 110, 112, and 114 are clients of server 104 and server 106. Clients 110, 112, and 114 may be, for example, point of sale devices, such as cash registers, with wire or wireless communication links to network 102. Clients 110, 112, and 114 generate transaction data corresponding to purchased items, such as, for example, products or services, associated with the one or more entities. However, clients 110, 112, and 114 may represent other types of data processing systems, such as, for example, network computers, laptop computers, handheld computers, smart phones, smart televisions, kiosks, and the like. Users of clients 110, 112, and 114 may utilize clients 110, 112, and 114 to perform online transactions to purchase goods or services with servers corresponding to the one or more entities.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of different transactions performed by the plurality of client devices, transaction data, such as items purchased, which corresponds to the plurality of different transactions, and the like. Furthermore, storage 108 may store other types of data, such as authentication or credential data that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. Data processing system 200 contains or controls a set of one or more unused resources that are available for use by other resource provider data processing systems. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data association analyzer 218. However, it should be noted that even though data association analyzer 218 is illustrated as residing in persistent storage 208, in an alternative illustrative embodiment data association analyzer 218 may be a separate component of data processing system 200. For example, data association analyzer 218 may be a hardware component coupled to communication fabric 202 or a combination of hardware and software components. In another alternative illustrative embodiment, a first set of components of data association analyzer 218 may be located in data processing system 200 and a second set of components of data association analyzer 218 may be located in a second data processing system, such as, for example, server 106 in FIG. 1.

Data association analyzer 218 controls the process of reducing noise in data during association analysis to decease a number of association rules corresponding to an association rules model of the data. Original data 220 may represent any type of data, but in this example, original data 220 represents original transaction data corresponding to purchased items of an entity. Data association analyzer 218 may retrieve original data 220 from a transaction database, such as, for example, storage 108 in FIG. 1, in response to receiving an input to perform an association analysis on original data 220.

Data association analyzer 218 generates original data truth table 222 based on original data 220. Each row of original data truth table 222 corresponds to a particular customer transaction to purchase a set of items. Identifiers 224 represent unique identifiers that correspond to each particular transaction and are included in each row of original data truth table 222 to identify each respective transaction. In addition, each column of original data truth table 222 corresponds to a particular item that was purchased during transactions. Items 226 represent those items that were purchased by customers and are associated with their corresponding identifiers 224. In other words, the rows of original data truth table 222 contain identifiers 224 and true or false values for items 226, while the columns list items 226 included in premises of original data truth table 222.

Data association analyzer 218 calculates support value 228 by dividing a number of transaction records in which items 226 included in original data truth table 222 have a true value by a total number of transaction records in original data truth table 222. Support value 228 represents an amount of items, which are included in transaction records, having a true value in an original data truth for supporting the association analysis. Data association analyzer 218 generates association rules model 230 having support value 228 with respect to original data 220 greater than or equal to support value threshold level 232. Association rules model 230 enables data association analyzer 218 to generate recommendations for potential customer item purchases based on correlations discovered between items 226. Support value threshold level 232 represents a predefined minimum support value threshold level, such as, for example, a support value of ten. In other words, association rules model 230 includes data from at least a minimum number of records (i.e., ten in this example) to provide adequate support for the association analysis.

Data association analyzer 218 identifies the number of association rules 234 in association rules model 230. Association rules 234 identify all sets of items in items 226 that have support value 228 greater than or equal to the predefined minimum support value threshold level 232. If data association analyzer 218 determines that the number of association rules 234 corresponding to association rules model 230 is less than or equal to association rules threshold level 236, then data association analyzer 218 generates inverted data 238 of original data 220. Association rules threshold level 236 represents a predefined maximum number of association rules, such as, for example, twenty-five association rules.

Inverted data truth table 240 corresponds to inverted data 238. Inverted data truth table 240 is similar to original data truth table 222. However, data association analyzer 218 generates inverted data truth table 240 by changing the true/false values for items 226 in the rows of inverted data truth table 240 opposite of the true/false values for items 226 in the rows of original data truth table 222. For example, if the row value for a particular item was true (e.g., the item was purchased during that particular transaction) in original data truth table 222, then data association analyzer 218 changes the row value for the particular item to false (e.g., the item was not purchased during that same transaction) in inverted data truth table 240. Thus, identifiers 242 are the same as identifiers 224. In other words, identifiers 242 in inverted data truth table 240 identify the same transactions as identifiers 224 in original data truth table 222. Similarly, inverted items 244 are the same as items 226. In other words, inverted items 244 in inverted data truth table 240 list the same items as items 226, which are listed in the columns of original data truth table 222.

The association rules model also enables data association analyzer 218 to generate certainty factor values 246 for association rules comparison. Data association analyzer 218 generates certainty factor value 246 for each association rule in each row of both original data truth table 222 and inverted data truth table 240. Certainty factor value 246 may be, for example, a confidence level score. In other words, certainty factor value 246 represents a level of confidence that a customer will purchase (e.g., a certainty factor value in original data truth table 222) or will not purchase (e.g., a certainty factor value in inverted data truth table 240) a recommendation result (i.e., an item) corresponding to the association rule of that particular row in both of the truth tables. In other words, the greater the value of certainty factor value 246, the less certainty factor value 246 represents a prediction and the more certainty factor value 246 represents an actuality or reality. Data association analyzer 218 generates certainty factor value 246 for each association rule in each row of both original data truth table 222 and inverted data truth table 240 by dividing a number of records in which items included in premises of the truth tables and recommendation results have a true value by a number of records in which items included in the premises have a true value. A recommendation result is an item that a customer will or will not potentially purchase with other items of an association rule corresponding to a particular row in both of the truth tables, respectively.

Data association analyzer 218 compares certainty factor value 246 of each association rule of each row of both original data truth table 222 and inverted data truth table 240 and then selects the association rule in each row having a greater certainty factor value from either original data truth table 222 or inverted data truth table 240. Data association analyzer 218 updates original data 220 to form updated original data 248 using the selected association rules having the highest certainty factor values in either original data truth table 222 or inverted data truth table 240. Further, data association analyzer 218 deletes or removes from the truth tables those association rules having all false values for their corresponding items. As a result, data association analyzer 218 processes fewer association rules during the next iteration, enabling data association analyzer 218 to work faster and more efficiently. Data association analyzer 218 continues this iterative process until the number of association rules is less than or equal to the predefined maximum association rule threshold number.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 250 is located in a functional form on computer readable media 252 that is selectively removable and may be loaded onto or transferred to data processing system 200 for running by processor unit 204. Program code 250 and computer readable media 252 form computer program product 254. In one example, computer readable media 252 may be computer readable storage media 256 or computer readable signal media 258. Computer readable storage media 256 may include, for example, an optical or magnetic disc that is inserted or placed into a drive or other device that is part of persistent storage 208 for transfer onto a storage device, such as a hard drive, that is part of persistent storage 208. Computer readable storage media 256 also may take the form of a persistent storage, such as a hard drive, a thumb drive, or a flash memory that is connected to data processing system 200. In some instances, computer readable storage media 256 may not be removable from data processing system 200.

Alternatively, program code 250 may be transferred to data processing system 200 using computer readable signal media 258. Computer readable signal media 258 may be, for example, a propagated data signal containing program code 250. For example, computer readable signal media 258 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 250 may be downloaded over a network to persistent storage 208 from another device or data processing system through computer readable signal media 258 for use within data processing system 200. For instance, program code stored in a computer readable storage media in a data processing system may be downloaded over a network from the data processing system to data processing system 200. The data processing system providing program code 250 may be a server computer, a client computer, or some other device capable of storing and transmitting program code 250.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 256 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

When performing an association analysis of transaction data, such as purchase behavior of customers, association rules are obtained. For example, a customer purchasing items P1, P2, . . . Pn (preconditions/premises) will also purchase item R (a recommendation result) at a certainty factor C (a confidence level score). Since transaction data generally includes noise (e.g., invalid data), such as forgetting to complete a purchase of an item, the number of association rules obtained as a result of the association analysis tends to be large. Therefore, increases in experiences, intuitions, and time are necessary for a data association analyzer to understand and utilize the association rules.

Assuming that original transaction data includes noise, illustrative embodiments update the original transaction data by deleting invalid data considered to be noise using a result of the association analysis. Because illustrative embodiments eliminate the noisy data by performing an update of the original transaction data, illustrative embodiments decrease the number of outputted association rules, which enables the data association analyzer to increase the speed with which the data association analyzer understands and utilizes the association rules. In other words, it is difficult for the data association analyzer to process and understand a large number of association rules quickly.

Illustrative embodiments remove portions of the original transaction data considered to be noisy data so that the number of outputted association rules is less than or equal to a predefined maximum number of association rules. As a result, illustrative embodiments decrease the number of outputted association rules to a level at or below the predefined maximum number. By excluding association rules that do not apply to a majority of customers (i.e., items purchased/not purchased by most customers), illustrative embodiments enable the data association analyzer to understand the association rules presented to it more quickly. Thus, illustrative embodiments facilitate a faster understanding of customer purchasing behavior by the data association analyzer. Therefore, illustrative embodiments play an important role in identifying the purchasing behavior of customers.

Thus, illustrative embodiments provide one or more technical solutions that overcome a technical problem with performing association analysis on noisy data. As a result, these one or more technical solutions provide a technical effect and practical application in the field of association analysis by reducing noise in transaction data during association analysis to decease a number of association rules corresponding to an association rules model of the transaction data. Therefore, illustrative embodiments decrease the processing time and increase the speed and efficiency of the data association analyzer to understand customer purchasing behavior.

With reference now to FIG. 3, a diagram illustrating truth tables of analysis data is depicted in accordance with an illustrative embodiment. Truth tables of analysis data 300 may be implemented in a computer, such as, for example, server 104 in FIG. 1 or data processing system 200 in FIG. 2. Truth tables of analysis data 300 include original transaction data truth table 302 and inverted transaction data truth table 304. Original transaction data truth table 302 and inverted transaction data truth table 304 may be, for example, original data truth table 222 and inverted data truth table 240 in FIG. 2.

In this example, both original transaction data truth table 302 and inverted transaction data truth table 304 list transaction identifiers 1, 2, 3, 4, and 5 in a respective corresponding row. In addition, original transaction data truth table 302 lists items "Fruit", "Vegetable", and "Meat" in a respective corresponding column. Similarly, inverted transaction data truth table 304 lists items "Fruit inverted", "Vegetable inverted", and "Meat inverted" in a respective corresponding column.

In row 1 of original transaction data truth table 302, the true/false values for Fruit, Vegetable, and Meat are true (T), true (T), and false (F), respectively. Conversely, in row 1 of inverted transaction data truth table 304 the true/false values for Fruit inverted, Vegetable inverted, and Meat inverted are false (F), false (F), and true (T), respectively, which is opposite of row 1 in original transaction data truth table 302. Similarly, the true/false values in each of rows 2, 3, 4, and 5 are opposite in inverted transaction data truth table 304 as in each of corresponding rows 2, 3, 4, and 5 of original transaction data truth table 302.

With reference now to FIG. 4, a diagram illustrating an example of association scoring is depicted in accordance with an illustrative embodiment. Association scoring 400 may be implemented in a data association analyzer, such as data association analyzer 218 in FIG. 2. It should be noted that original transaction data 402 and inverted transaction data 404 contain the same information as original transaction data truth table 302 and inverted transaction data truth table 304, respectively, in FIG. 3. However, original transaction data 402 and inverted transaction data 404 also include recommendations and certainty factor values for each respective row.

In this example, row 1 of original transaction data 402 includes a recommendation of Meat with a calculated certainty factor value of 0.58 and row 1 of inverted transaction data 404 includes a recommendation of Fruit inverted with a calculated certainty factor value of 0.44. Because the Meat recommendation has a greater certainty factor value (0.58) than the certainty factor value (0.44) of the Fruit inverted recommendation, the data association analyzer selects the Meat recommendation for the association rule of row 1. Row 2 of original transaction data 402 includes a recommendation of Fruit with a calculated certainty factor value of 0.42 and row 2 of inverted transaction data 404 includes a recommendation of Meat inverted with a calculated certainty factor value of 0.51. As a result, the data association analyzer selects the Meat inverted recommendation for the association rule of row 2 because the Meat inverted recommendation has the greater certainty factor value (0.51) of the two recommendations. Row 3 of original transaction data 402 includes a recommendation of Vegetable with a calculated certainty factor value of 0.67 and row 3 of inverted transaction data 404 includes a recommendation of Fruit inverted with a calculated certainty factor value of 0.33. As a result, the data association analyzer selects the Vegetable recommendation for the association rule of row 3 because the Vegetable recommendation has the greater certainty factor value (0.67) of the two recommendations. Row 4 of original transaction data 402 includes a recommendation of Fruit with a calculated certainty factor value of 0.33 and row 4 of inverted transaction data 404 includes a recommendation of Meat inverted with a calculated certainty factor value of 0.47. As a result, the data association analyzer selects the Meat inverted recommendation for the association rule of row 4 because the Meat inverted recommendation has the greater certainty factor value (0.47) of the two recommendations. Row 5 of original transaction data 402 includes a recommendation of Fruit with a calculated certainty factor value of 0.44 and row 5 of inverted transaction data 404 includes a recommendation of Meat inverted with a calculated certainty factor value of 0.38. As a result, the data association analyzer selects the Fruit recommendation for the association rule of row 5 because the Fruit recommendation has the greater certainty factor value (0.44) of the two recommendations.

With reference now to FIG. 5, a diagram illustrating an example of updated original transaction data based on certainty factor value comparison is depicted in accordance with an illustrative embodiment. Updated original transaction data based on certainty factor value comparison 500 may be implemented in a data association analyzer, such as data association analyzer 218 in FIG. 2. It should be noted that the updated original transaction data this example is similar to original transaction data 402 in FIG. 4, but that particular true/false values in rows 1-5 have changed based on the certainty factor values of the association rules corresponding to the selected recommendations in the example of FIG. 4.

For example, in row 1 the true/false value for Meat has changed from false (F) in FIG. 4 to true (T) in FIG. 5 because the association rule corresponding to the selected Meat recommendation had the greater certainty factor value. Similarly, in row 2 the true/false value for Meat has changed from true (T) in FIG. 4 to false (F) in FIG. 5 because the association rule corresponding to the selected Meat inverted recommendation had the greater certainty factor value. In row 3 the true/false value for Vegetable has changed from false (F) in FIG. 4 to true (T) in FIG. 5 because the association rule corresponding to the selected Vegetable recommendation had the greater certainty factor value. In row 4 the true/false value for Meat has changed from true (T) in FIG. 4 to false (F) in FIG. 5 because the association rule corresponding to the selected Meat inverted recommendation had the greater certainty factor value. It should be noted that the association rule corresponding to row 4 now contains items included in the premises of the truth table all having false (F) values. As a result, data association analyzer considers the association rule corresponding to row 4 as noisy data. In row 5 the true/false value for Fruit has changed from false (F) in FIG. 4 to true (T) in FIG. 5 because the association rule corresponding to the selected Fruit recommendation had the greater certainty factor value.

With reference now to FIG. 6, a diagram illustrating an example of deleting association rules containing noisy data is depicted in accordance with an illustrative embodiment. Deleting association rules containing noisy data 600 may be implemented in a data association analyzer, such as data association analyzer 218 in FIG. 2. It should be noted that the data in the truth table of FIG. 6 is the same as the data in the truth table in the example of FIG. 5, except the data association analyzer has deleted or removed the association rule corresponding to the row of transaction identifier 4 because, as shown in the example of FIG. 5, row 4 contained only false (F) values for the items.

Figure 7B:
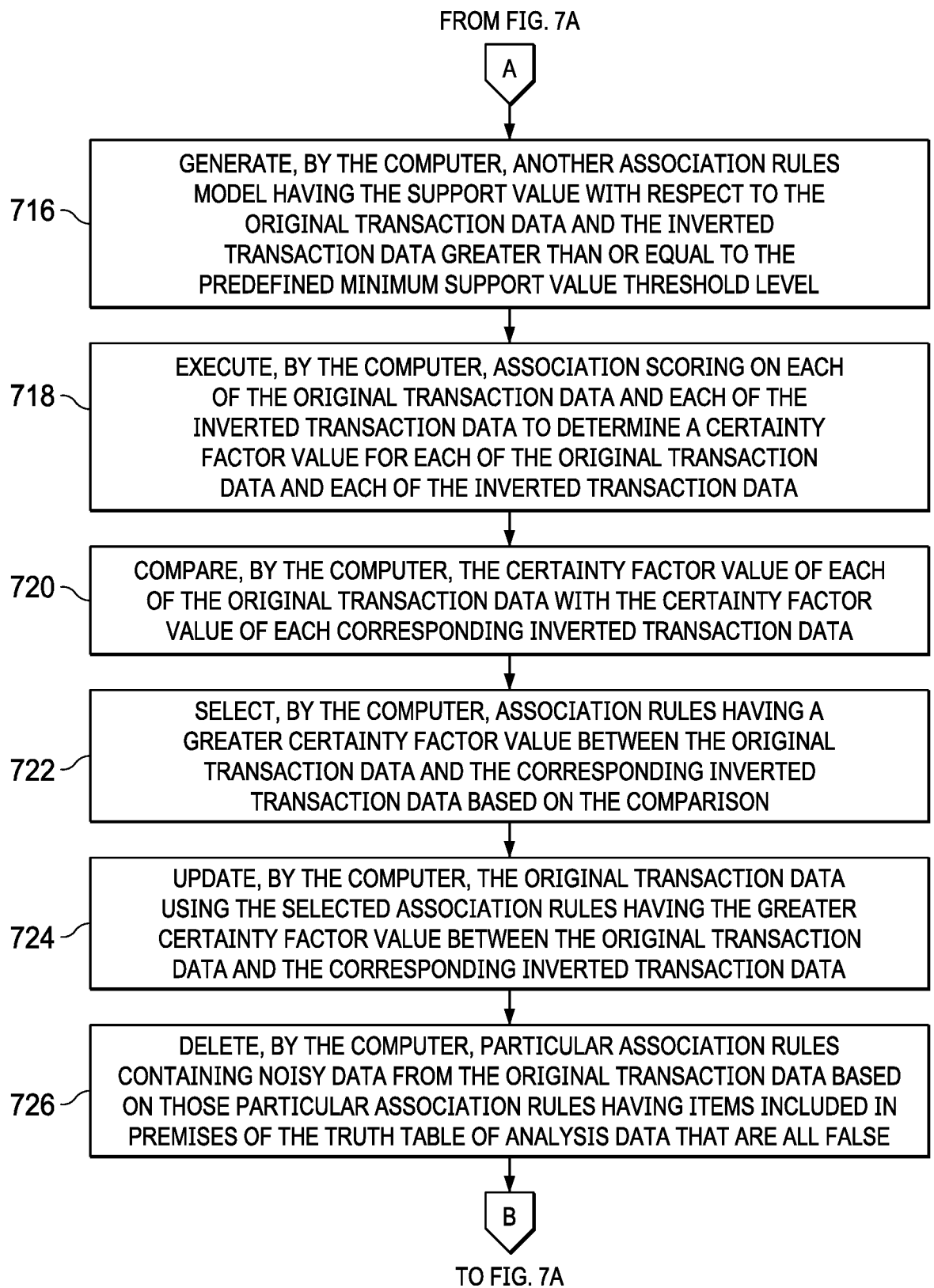

With reference now to FIGS. 7A-7B, a flowchart illustrating a process for removing noise from original transaction data is shown in accordance with an illustrative embodiment. The process shown in FIGS. 7A-7B may be implemented in a computer, such as, for example, server 104 in FIG. 1 or data processing system 200 in FIG. 2.

The process begins when the computer receives an input to perform an association analysis on original transaction data corresponding to an entity (step 702). The entity may be, for example, a business, company, enterprise, organization, institution, agency, or the like. The original transaction data may be any type of transaction data. The computer retrieves the original transaction data from a transaction database (step 704). The transaction database may be, for example, storage 108 in FIG. 1.

The computer calculates a support value by dividing a number of transaction records in which items included in premises of a truth table of analysis data are true by a total number of transaction records (step 706). In addition, the computer generates an association model having the support value with respect to the original transaction data greater than or equal to a predefined minimum support value threshold level (step 708). The predefined minimum support value threshold level may be, for example, ten. Further, the computer identifies a number of association rules corresponding to the association model (step 710).

The computer makes a determination as to whether the identified number of association rules is less than or equal to a predefined maximum number of association rules (step 712). The predefined maximum number of association rules may be, for example, twenty-five. If the computer determines that the identified number of association rules is less than or equal to the predefined maximum number of association rules, yes output of step 712, then the process terminates thereafter.

If the computer determines that the identified number of association rules is greater than the predefined maximum number of association rules, no output of step 712, then the computer generates inverted transaction data of the original transaction data (step 714). Further, the computer generates another association model having the support value with respect to the original transaction data and the inverted transaction data greater than or equal to the predefined minimum support value threshold level (step 716). Furthermore, the computer executes association scoring on each of the original transaction data and each of the inverted transaction data to determine a certainty factor for each of the original transaction data and each of the inverted transaction data (step 718).

Afterward, the computer compares the certainty factor of each of the original transaction data with the certainty factor of each corresponding inverted transaction data (step 720). The computer selects those association rules having a greater certainty factor between the original transaction data and the corresponding inverted transaction data based on the comparison (step 722). The computer updates the original transaction data using the selected association rules having the greater certainty factor between the original transaction data and the corresponding inverted transaction data (step 724). The computer deletes particular association rules containing noisy data from the original transaction data based on those particular association rules having items included in premises of the truth table of analysis data that are all false (step 726). Thereafter, the process returns to step 708 where the computer generates still another association model. As a result, the process continues to repeat steps 708-726 until the number of association rules is less than or equal to the predefined maximum number of association rules.

Thus, illustrative embodiments of the present invention provide a computer-implemented method, computer system, and computer program product for reducing noise in transaction data during association analysis to decease a number of association rules corresponding to an association rules model of the transaction data, thereby increasing speed and performance of a data association analyzer. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing noise during association analysis, the method comprising:

retrieving, from a transaction database by a data association analyzer executing in a memory of a data processing system, original data that represents original transaction data corresponding to purchased items of an entity in response to receiving an input to perform association analysis on the original data;

generating, by the data association analyzer executing in the memory of the data processing system, an association model having a support value with respect to the original data greater than a predefined minimum support value threshold level;

identifying, by the data association analyzer executing in the memory of the data processing system, a number of association rules corresponding to the association model;

determining, by the data association analyzer executing in the memory of the data processing system, whether the number of association rules corresponding to the association model is less than a predefined maximum number of association rules;

responsive to determining by the data association analyzer that the number of association rules corresponding to the association model is greater than the predefined maximum number of association rules, generating, by the data association analyzer executing in the memory of the data processing system, inverted data of the original data;

generating, by the data association analyzer executing in the memory of the data processing system, another association model having the support value with respect to the original data and the inverted data greater than the predefined minimum support value threshold level;

executing, by the data association analyzer executing in the memory of the data processing system, association scoring on each of the original data and each of the inverted data to determine a certainty factor for each of the original data and each of the inverted data;

comparing, by the data association analyzer executing in the memory of the data processing system, the certainty factor of each of the original data with the certainty factor of each corresponding inverted data;

selecting, by the data association analyzer executing in the memory of the data processing system, association rules having a greater certainty factor between the original data and the corresponding inverted data based on the comparing;

updating, by the data association analyzer executing in the memory of the data processing system, the original data using the association rules having the greater certainty factor between the original data and the corresponding inverted data; and deleting, by the data association analyzer executing in the memory of the data processing system, particular association rules containing noisy data from the updated original data based on those particular association rules having items included in premises of a truth table of the updated original data that are all false to thereby facilitate a faster understanding of entity purchasing behavior during the association analysis by the data association analyzer.

2. The method of claim 1, wherein the certainty factor is determined by dividing a number of records in which items included in premises of truth tables and recommendation results are true by a number of records in which items included in the premises are true.

3. The method of claim 1 further comprising:
calculating, by the data association analyzer executing in the memory of the data processing system, the support value by dividing a number of records in which items included in premises of a truth table of the original data are true by a total number of records.

4. The method of claim 1, wherein the original data truth table and the inverted data truth table both list a recommendation result and a certainty factor in each row, and wherein the recommendation result is an item that a customer will or will not potentially purchase with other items of an association rule corresponding to a particular row in both the original data truth table and the inverted data truth table, respectively, and wherein the certainty factor is a level of confidence that a customer will purchase or will not purchase the recommendation result corresponding to the association rule of that particular row in both of the original data truth table and the inverted data truth table, respectively.

5. The method of claim 1 further comprising:
repeating steps until the number of association rules is less than the predefined maximum number of association rules.

6. A computer system for reducing noise during association analysis, the computer system comprising:
a bus system;
a storage device connected to the bus system, wherein the storage device stores program instructions; and
a processor connected to the bus system, wherein the processor executes the program instructions to:
retrieve from a transaction database original data that represents original transaction data corresponding to purchased items of an entity in response to receiving an input to perform association analysis on the original data;
generate an association model having a support value with respect to the original data greater than a predefined minimum support value threshold level;
identify a number of association rules corresponding to the association model;
determine whether the number of association rules corresponding to the association model is less than a predefined maximum number of association rules;
generate inverted data of the original data in response to determining that the number of association rules corresponding to the association model is greater than the predefined maximum number of association rules;
generate another association model having the support value with respect to the original data and the inverted data greater than the predefined minimum support value threshold level;
execute association scoring on each of the original data and each of the inverted data to determine a certainty factor for each of the original data and each of the inverted data;
compare the certainty factor of each of the original data with the certainty factor of each corresponding inverted data;
select association rules having a greater certainty factor between the original data and the corresponding inverted data based on the comparing;
update the original data using the association rules having the greater certainty factor between the original data and the corresponding inverted data; and
delete particular association rules containing noisy data from the updated original data based on those particular association rules having items included in premises of a truth table of the updated original data that are all false to thereby facilitate a faster understanding of entity purchasing behavior by the data association analyzer to thereby facilitate a faster understanding of entity purchasing behavior during the association analysis.

7. The computer system of claim 6, wherein the certainty factor is determined by dividing a number of records in which items included in premises of truth tables and recommendation results are true by a number of records in which items included in the premises are true.

8. A computer program product for reducing noise during association analysis, the computer program product comprising a computer readable storage medium having program instructions embodied therewith, the program instructions executable by a computer to cause the computer to perform a method comprising:
retrieving original data that represents original transaction data corresponding to purchased items of an entity in response to receiving an input to perform association analysis on the original data;
generating an association model having a support value with respect to original data greater than a predefined minimum support value threshold level;
identifying a number of association rules corresponding to the association model;
determining whether the number of association rules corresponding to the association model is less than a predefined maximum number of association rules;
responsive to determining that the number of association rules corresponding to the association model is greater than the predefined maximum number of association rules, generating inverted data of the original data;
generating another association model having the support value with respect to the original data and the inverted data greater than the predefined minimum support value threshold level;
executing association scoring on each of the original data and each of the inverted data to determine a certainty factor for each of the original data and each of the inverted data;
comparing the certainty factor of each of the original data with the certainty factor of each corresponding inverted data;
selecting association rules having a greater certainty factor between the original data and the corresponding inverted data based on the comparing;
updating the original data using the association rules having the greater certainty factor between the original data and the corresponding inverted data; and
deleting particular association rules containing noisy data from the updated original data based on those particular association rules having items included in premises of a truth table of the updated original data that are all false to thereby facilitate a faster understanding of entity purchasing behavior during the association analysis.

9. The computer program product of claim 8, wherein the certainty factor is determined by dividing a number of records in which items included in premises of truth tables and recommendation results are true by a number of records in which items included in the premises are true.

10. The computer program product of claim 8 further comprising:
 calculating the support value by dividing a number of records in which items included in premises of a truth table of the original data are true by a total number of records.

\* \* \* \* \*